UNITED STATES PATENT OFFICE.

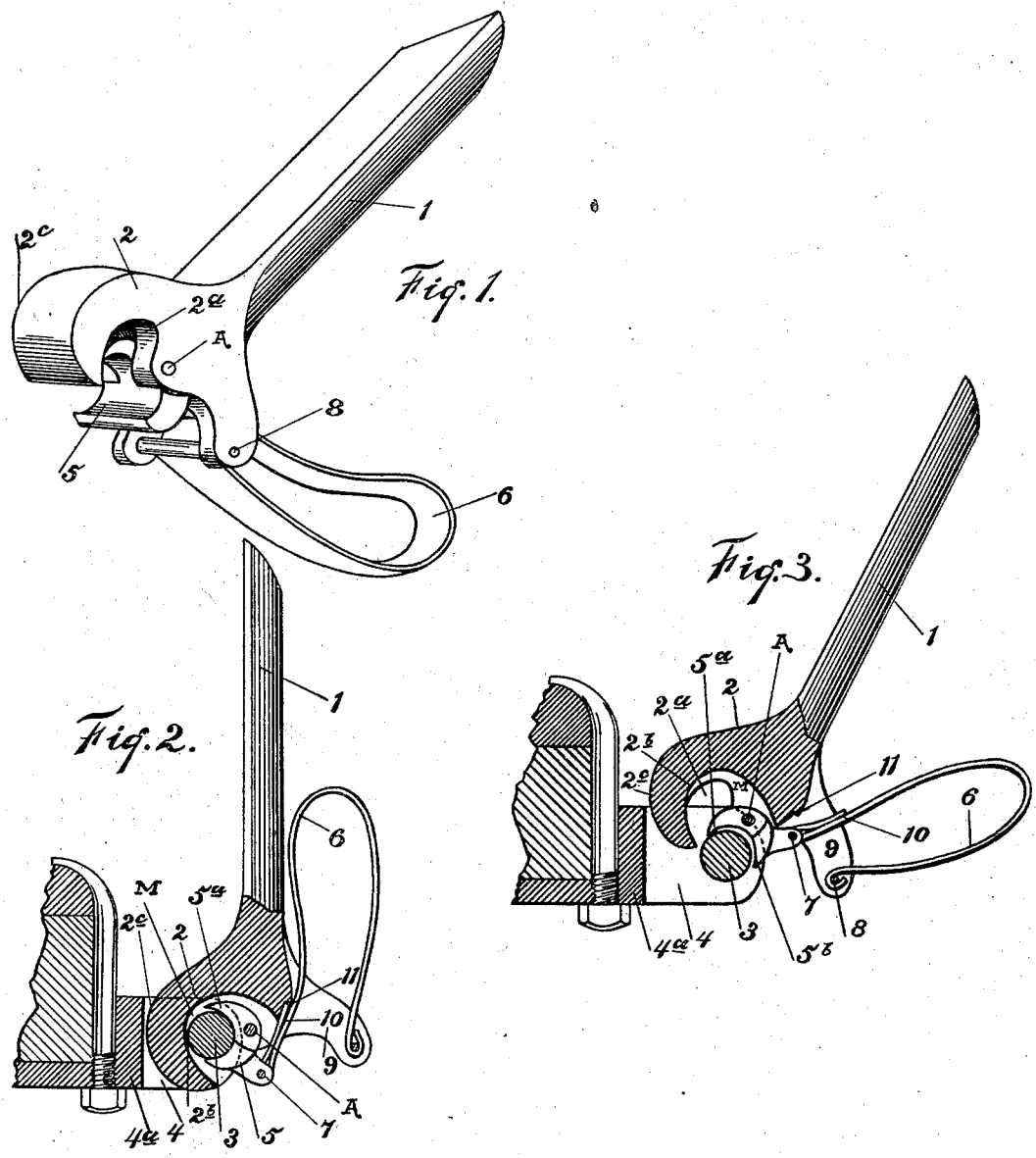

GEORGE H. SPITZLI AND GEORGE E. LORD, OF UTICA, NEW YORK; SAID LORD ASSIGNOR TO ARTHUR B. MAYNARD, OF UTICA, NEW YORK.

THILL-COUPLING.

SPECIFICATION forming part of Letters Patent No. 705,795, dated July 29, 1902.

Application filed November 23, 1901. Serial No. 83,431. (No model.)

*To all whom it may concern:*

Be it known that we, GEORGE H. SPITZLI and GEORGE E. LORD, of Utica, in the county of Oneida and State of New York, have invented certain new and useful Improvements in Thill-Couplings; and we do hereby declare that the following is a full, clear, and exact description of the invention, which will enable others skilled in the art to which it appertains to make and use the same, reference being had to the accompanying drawings, and to the characters of reference marked thereon, which form part of this specification.

The object of our invention is to provide a thill-coupling which is adapted for use on the ordinary clips provided on wagons, obviating the use of a special clip on the wagon, and which is simple and effective in its construction and safe from accidental detachment.

In the drawings, Figure 1 shows a perspective view of our shaft-coupling in open or unlocked position. Fig. 2 shows a view, partially in section, of the shaft-coupling attached to a vehicle ready for use and in position of use. Fig. 3 shows in a manner similar to Fig. 2 the shaft-coupling being attached to or removed from the wagon or vehicle with the parts in their open or unlocked position.

Referring to the reference letters and figures in a more particular description, 1 indicates the shank of the coupling, which is adapted to be attached to the thills. The shank is formed integral with the head or hook portion 2. The recess $2^a$ of the hook or head is made from the bottom upwardly and is adapted to receive the clip-bolt 3 of the clip 4, attached to the vehicle. The form and position of the hook portion of the head are of importance. When in use, the shank portion 1 is adapted to stand in a substantially vertical position, as shown in Fig. 2. The inner face $2^b$ of the hook when the shank is in this position engages with the bolt 3, while the outside or back $2^c$ of the hook stands in close proximity to the cross-wall $4^a$ of the clip, so that the hook cannot be disengaged from the vehicle when the shank 1 is in a substantially vertical position. Pivoted in the head at $a$ is the latch or lock 5. This latch or lock 5 is provided with a finger portion $5^a$, adapted to be engaged by the bolt 3 in attaching the thill-coupling, as indicated in Fig. 3, and as the hook-head 2 is forced downward causes the latch to close. In its closed position the portion $5^b$ of the latch or lock engages with the under side of the bolt 3 and locks the thill-coupling to the bolt. For holding the lock 5 in open or closed position there is provided a bow-spring 6, which is pivoted at one end to the lock 5 at 7 and at the other end at 8 in the arms 9 from the head. After forming the eye to receive the pivot-pin 7 the end of the spring is continued in a catch portion 10, the end of which is adapted when the coupling is closed to engage with the shoulder 11 on the head and prevent the lock 5 from opening by pressure applied thereto. There is provided in the head 2 a recess $m$, which receives the finger portion $5^a$ of the lock when the thill-coupling is attached. The shank 1 when the coupling is used with thills is preferably arranged to stand substantially vertically, as shown, when the horse is attached; but of course this is not necessarily so, and the relative position of the shank and head may be varied to suit circumstances. For use with a wagon-pole they would preferably be so varied.

In order to attach the coupling to a vehicle or detach it therefrom, it is necessary to depress the outer ends of the shafts or thills, which are attached to the horse, to the base or ground line, which will throw the shank 1 over into an inclined position, as shown in Fig. 3. In this position the hook portion of the coupling will freely pass between the bolt 3 and the cross-wall $4^a$ in making a vertical movement in attaching or detaching. In attaching the coupling it is brought into position and the bolt 3 engages with the finger portion $5^a$ of the lock. Pressure is then applied to force the lock toward its closed position. In the first part of the movement the pivot 7 is moved from the right-hand side of a direct line between pivots $a$ and 8, as shown in Fig. 3, to a point at the left of this line. In this movement the spring 6 is sufficiently compressed to permit this movement. After the pivot 7 has passed to the left of the direct line the spring 6 then operates to close the lock with a snap and complete the coupling. The lock 5 is held by the spring 6 under pressure, so that the bolt 3 is tightly gripped between the inner side of the recess in the head and the working face of the lock.

In detaching the coupling when the outer ends of the thills are depressed, as described, the operator with his hands or foot throws the spring 6 from the position shown in Fig. 2 to that shown in Fig. 3. This disengages the catch 10 and opens the lock, and the finger portion $5^a$, pressing upon top of the bolt 3, throws off the hook into the position shown in Fig. 3, when the thills can be removed.

The catch 10 and the catch-shoulder 11 may be dispensed with. The relative position of the catch 10 and shoulder 11 is such that the lock 5 will then take the largest-size bolt 3 with which the coupling is adapted for use. When a smaller-sized bolt 3 is used, the lock 5 will be closed up tightly on it by the action of the spring 6, so as to prevent rattling. In such a case the catch 10 and shoulder 11 would operate to prevent an accidental opening, but not quite as promptly as when a full-sized bolt 3 was used.

What we claim as new, and desire to secure by Letters Patent, is—

1. The combination in a thill-coupling of the axle-clip and pin and the thill part having a downwardly-opening recess therein adapted to receive the clip-pin, a lock pivoted to the thill part and arranged to close said recess and engage the clip-pin, a bowed spring pivoted at one end to the said thill part and at the other to the said lock, said last-mentioned pivotal point being arranged to pass to both sides of the direct line between the pivot of the lock and the pivot of the spring, substantially as set forth.

2. The combination in a thill-coupling of the thill part having a downwardly-opening hook adapted to receive and engage the coupling-bolt and the hook portion of a size and arranged at an angle to engage both the coupling-bolt and the wall of the clip back of the coupling-bolt when in position for use and prevent vertical displacement, a lock or latch operating in the hook-opening and adapted to engage the bolt, and a spring for holding said lock or latch in open or closed position, substantially as set forth.

3. The combination with the thill portion of a thill-coupling having a downwardly-opening recess therein adapted to receive the coupling-bolt, a lock or latch arranged in said recess and having a part adapted to engage the coupling-bolt from the under side in securing said coupling and a part adapted to engage the coupling-bolt from the top in attaching or detaching said coupling and a spring for holding said lock or latch in closed or open position, substantially as set forth.

4. The combination with the thill portion of a thill-coupling having a downwardly-opening hook-recess to receive the coupling-bolt of a lock for closing said opening, a spring for holding said lock in open or closed position and means for automatically closing the lock, substantially as set forth.

5. The combination in a thill-coupling of the head having a hook-recess to receive the coupling-bolt, a lock to close said recess and grip the bolt, a spring for holding said lock in closed position and a catch for securing said lock against accidental opening, substantially as set forth.

6. The combination in a thill-coupling of the axle-clip and pin and the thill part having a downwardly-opening recess therein adapted to receive the clip-pin, a lock pivoted to the thill part in front of said recess and adapted to close said recess and arranged to engage said clip-pin both on the upper and lower sides, a bowed spring pivoted at one end to said thill part and at the other to said lock, said last-mentioned pivotal point being arranged to pass to both sides of the direct line between the pivot of the lock and the pivot of the spring, substantially as set forth.

In witness whereof we have affixed our signatures, in presence of two witnesses, this 6th day of November, 1901.

GEORGE H. SPITZLI.
GEORGE E. LORD.

Witnesses:
CHARLES G. IRISH,
S. A. BROWN.